US012755116B2

(12) United States Patent
Raikar et al.

(10) Patent No.: US 12,755,116 B2
(45) Date of Patent: Oct. 6, 2026

(54) SYSTEM AND METHOD FOR DECODING INFORMATION

(71) Applicant: Torc Robotics, Inc., Blacksburg, VA (US)

(72) Inventors: Akshay Pai Raikar, Austin, TX (US); William Gray Davis, Austin, TX (US); Garrett Madsen, Austin, TX (US); Joseph R. Fox-Rabinovitz, Austin, TX (US)

(73) Assignee: Torc Robotics, Inc., Blacksburg, VA (US)

( * ) Notice: Subject to any disclaimer, the term of this patent is extended or adjusted under 35 U.S.C. 154(b) by 0 days.

(21) Appl. No.: 18/978,163

(22) Filed: Dec. 12, 2024

(65) Prior Publication Data

US 2026/0170282 A1 Jun. 18, 2026

(51) Int. Cl.

| | |
|---|---|
| ***E01F 9/529*** | (2016.01) |
| ***E01F 9/50*** | (2016.01) |
| ***G06K 7/14*** | (2006.01) |
| ***G07C 5/02*** | (2006.01) |

(52) U.S. Cl.

CPC .............. *G06K 7/1408* (2013.01); *E01F 9/50* (2016.02); *E01F 9/529* (2016.02); *G07C 5/02* (2013.01)

(58) Field of Classification Search

None

See application file for complete search history.

(56) References Cited

U.S. PATENT DOCUMENTS 6,259,374 B1 * 7/2001 Kisner ................. G08G 1/0962 340/901
7,102,539 B2 9/2006 Kawazoe et al.
7,109,850 B2 9/2006 Kawazoe et al.
7,219,031 B2 5/2007 Kawazoe et al.
7,477,978 B2 * 1/2009 Kawazoe ................. B62D 6/00 701/1

(Continued)

FOREIGN PATENT DOCUMENTS

JP 2024531274 A * 8/2024 ............... G01C 7/04

OTHER PUBLICATIONS

Yazan A. Alqudah, Belal H. Sababha, Coded Rumble Strips To Enhance Reliability of Autonomous Vehicles, 2018, 2018 IEEE International Conference on Electro/Information Technology (Year: 2018).*

*Primary Examiner* — Thien M Le

*Assistant Examiner* — April A Taylor

(74) *Attorney, Agent, or Firm* — McCarter & English, LLP

(57) ABSTRACT

A system for decoding information is provided. The system includes a road defining a surface, and an encoded strip formed in the surface of the road or attached to the surface of the road. The encoded strip includes a set of peaks and/or valleys having at least one of an amplitude or a frequency selected to encode information. The system includes one or more sensors associated with a vehicle. The system includes a processing device in communication with the one or more sensors. The processing device is configured to execute instructions stored in a memory to perform operations including, as a first tire of the vehicle passes over the encoded strip, detecting a characteristic of the encoded strip with the one or more sensors. The operations include decoding the information from the encoded strip based on the detected characteristic.

20 Claims, 10 Drawing Sheets

(56) References Cited

U.S. PATENT DOCUMENTS

| | | | | |
|---|---|---|---|---|
| 8,427,341 | B2 * | 4/2013 | Yulevich | G08G 1/096783 340/901 |
| 9,142,130 | B1 * | 9/2015 | Dukish | G08G 1/095 |
| 9,234,960 | B1 * | 1/2016 | McIntosh | E01F 9/529 |
| 9,995,587 | B2 | 6/2018 | Haberl | |
| 10,253,468 | B1 | 4/2019 | Linville et al. | |
| 10,754,348 | B2 | 8/2020 | McClendon | |
| 10,875,535 | B2 | 12/2020 | Ozog | |
| 10,915,111 | B1 | 2/2021 | Argenti et al. | |
| 11,584,377 | B2 | 2/2023 | Cox et al. | |
| 11,801,726 | B2 | 10/2023 | Sridhar et al. | |
| 2018/0061238 | A1 * | 3/2018 | Lei | G08G 1/167 |
| 2019/0266890 | A1 * | 8/2019 | Lei | G08G 1/096716 |
| 2021/0010214 | A1 | 1/2021 | Bell | |
| 2022/0281456 | A1 | 9/2022 | Giovanardi et al. | |

* cited by examiner

SYSTEM AND METHOD FOR DECODING INFORMATION

TECHNICAL FIELD

The field of the disclosure relates to decoding of information with a vehicle and, in particular, to a system for decoding information as a tire of a vehicle passes over a strip with peaks and/or valleys on a road surface.

BACKGROUND

Autonomous vehicles employ fundamental technologies such as, perception, localization, behaviors and planning, and control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies process features in the sensed environment to correlate, or register, those features to known features on a map. Localization technologies may rely on inertial navigation system (INS) data. Behaviors and planning technologies determine how to move through the sensed environment to reach a planned destination. Behaviors and planning technologies process data representing the sensed environment and localization or mapping data to plan maneuvers and routes to reach the planned destination for execution by a controller or a control module. Controller technologies use control theory to determine how to translate desired behaviors and trajectories into actions undertaken by the vehicle through its dynamic mechanical components. This includes steering, braking and acceleration.

As the vehicle travels along its mission route, sensors of the vehicle gather data about the surrounding environment, as well as operation of the vehicle itself. In some instances, cameras associated with the vehicle can capture images of signage on the road and image recognition can be used to extract useful information for, e.g., localization of the vehicle. Similarly, a geographical positioning system (GPS) can be used to determine the location of the vehicle as it travels along the road. However, there may be limited space on the side of the road for additional signage to be used/detected by autonomous vehicles.

Accordingly, there exists a need for a system and a method of decoding information for an autonomous vehicle to assist with localization or any other information gathering as the vehicle travels along the road. These and other needs are met by the exemplary system for decoding information discussed herein.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY

In one aspect, an exemplary system for decoding information is provided. The system includes a road defining a surface, and an encoded strip formed in the surface of the road or attached to the surface of the road. The encoded strip includes a set of peaks and/or valleys having at least one of an amplitude or a frequency selected to encode information. The system includes one or more sensors associated with a vehicle. The system includes a processing device in communication with the one or more sensors. The processing device is configured to execute instructions stored in a memory to perform operations for decoding information. The operations include, as a first tire of the vehicle passes over the encoded strip, detecting a characteristic of the encoded strip with the one or more sensors. The operations include decoding the information from the encoded strip based on the detected characteristic.

The vehicle can be an autonomous vehicle or a semi-autonomous vehicle. The amplitude can be a valley depth relative to the peaks, and the frequency can be a valley spacing between the peaks. In some embodiments, the one or more sensors can include at least one of an accelerometer or a gyroscope. In some embodiments, the detected characteristic can be a vibration pattern created by the peaks and/or valleys of the encoded strip as the first tire of the vehicle passes over the encoded strip. In some embodiments, the detected characteristic can be an up and down motion pattern of the first tire relative to the surface of the road created by the peaks and/or valleys of the encoded strip as the first tire of the vehicle passes over the encoded strip. In some embodiments, the detected characteristic can be an angular rotation pattern of the first tire relative to the surface of the road created by the peaks and/or valleys of the encoded strip as the first tire of the vehicle passes over the encoded strip.

In some embodiments, the operations can include, as a second tire of the vehicle passes over the encoded strip, detecting the characteristic of the encoded strip with at least one sensor associated with the second tire of the vehicle. In such embodiments, the operations can include decoding the information from the encoded strip based on the detected characteristic. In such embodiments, the operations can include comparing the information decoded from the first tire and the second tire as confirmation or verification of accurate decoding.

In some embodiments, the information can include geolocation information associated with the road. In some embodiments, the encoded strip can be in the form of a rumble strip. In some embodiments, the amplitude and/or the frequency of the set of peaks and/or valleys can result in a binary pattern detectable by the one or more sensors of the vehicle.

In another aspect, an exemplary computer-implemented method for decoding information is provided. The method includes forming in a surface of a road or attaching to the surface of the road an encoded strip. The encoded strip includes a set of peaks and/or valleys having at least one of an amplitude or a frequency selected to encode information. The method includes passing a first tire of a vehicle over the encoded strip. The vehicle includes one or more sensors. The method includes executing instructions stored in a memory with a processing device in communication with the one or more sensors to perform operations for decoding information. The method includes detecting a characteristic of the encoded strip with the one or more sensors. The method includes decoding the information from the encoded strip based on the detected characteristic.

The amplitude can be a valley depth relative to the peaks, and the frequency can be a valley spacing between the peaks. In some embodiments, the detected characteristic can be a vibration pattern created by the peaks and/or valleys of the encoded strip as the first tire of the vehicle passes over the encoded strip. In some embodiments, the detected characteristic can be an up and down motion pattern of the first tire relative to the surface of the road created by the peaks and/or valleys of the encoded strip as the first tire of the vehicle passes over the encoded strip.

In another aspect, an exemplary information-encoded road is provided. The road includes a road defining a surface, and an encoded strip formed in the surface of the road or attached to the surface of the road. The encoded strip includes a set of peaks and/or valleys having at least one of an amplitude or a frequency selected to encode information configured to be decoded by a sensor of a vehicle passing over the encoded strip.

The amplitude can be a valley depth relative to the peaks, and the frequency can be a valley spacing between the peaks. The information can be configured to be decoded by the sensor of the vehicle when a tire of the vehicle passes over the encoded strip.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
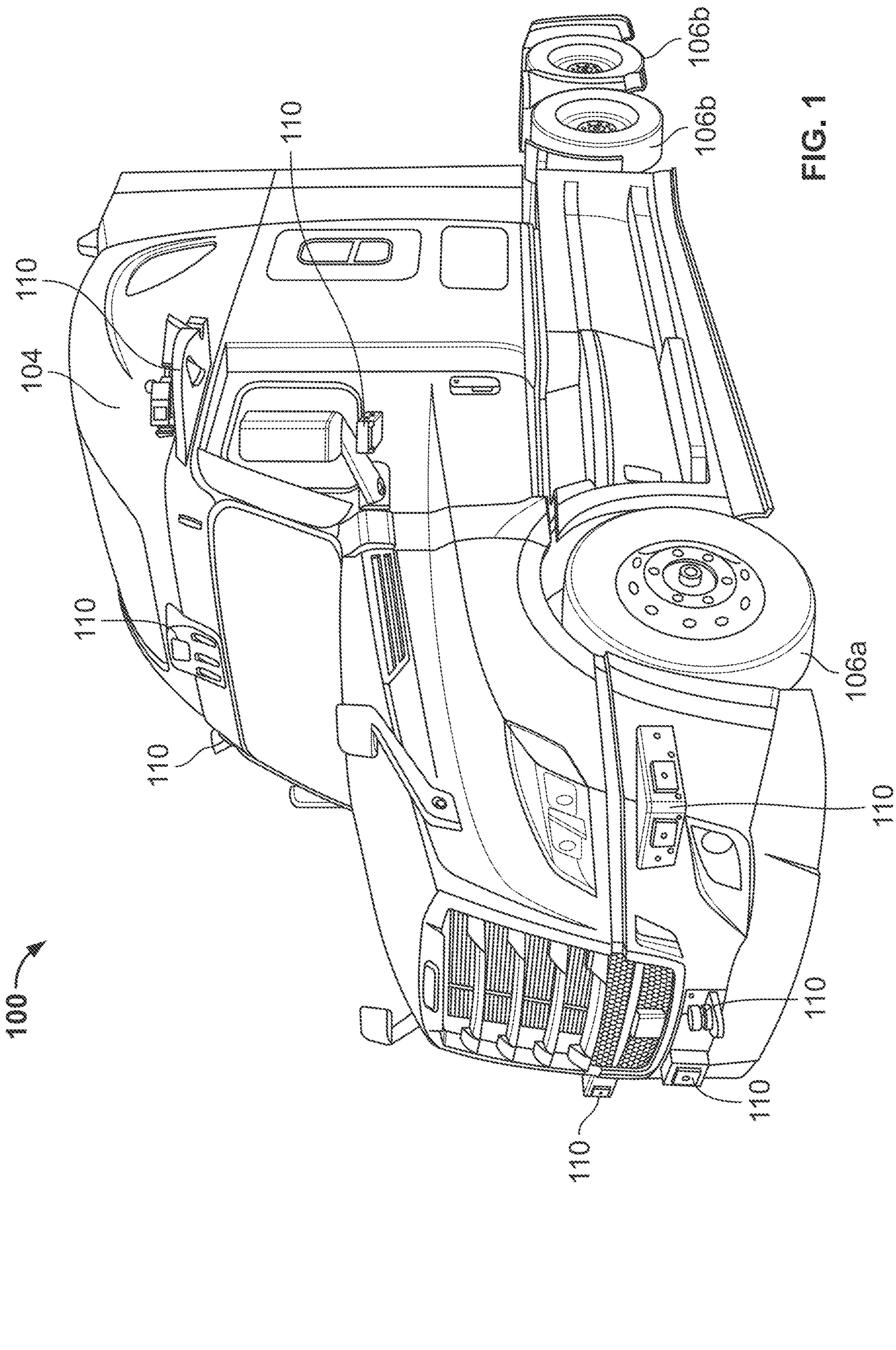
FIG. 1 is a schematic perspective view of an autonomous truck.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The following terms are used in the present disclosure as defined below.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

The exemplary system for decoding information can be incorporated into existing infrastructure, e.g., roadways, in the form of a rumble strip secured to the top of the roadway surface and/or peaks/valleys formed in the roadway itself. The information encoded in the strip can be used by vehicles to localize along a road using only an inertial measurement unit (IMUT) and/or a processing device associated with the vehicle or mission control. In some embodiments, the system can be incorporated into smart roads. In some embodiments, the system can be incorporated into existing roadways such that any vehicle having an electronic control unit (ECU), a processing device and/or an IMU (whether autonomous or not) can decode information from the strip.

The information can be encoded into the strip and/or roadway via amplitude (e.g., groove/valley depth) and frequency (e.g., groove/valley spacing). In some embodiments, frequency encoding can offer a more robust option for high-density coding. In some embodiments, a single encoded strip can be used on the side of the roadway and/or between lanes of a roadway. In some embodiments, a separate encoded strip or patch can be used for left and right wheels in the same lane. In such embodiments, separate readout hardware, e.g., accelerometers on each wheel, a full IMU, or the like, can measure the roll of the individual wheels. In some embodiments, a readout system with a single sensor (e.g., accelerometer) can be used. In some embodiments, a pair of accelerometers can be used if both wheels are engaged and configured to assist with decoding information. In some embodiments, an IMU can include both an accelerometer and gyroscope to detect angular rotation in the roll axis to decode separate signals from both wheels.

In some embodiments, a pair of IMUs, one mounted between or associated with the front wheels and one mounted between or associated with the rear wheels, can be used to verify the encoded signal read by the front wheels by re-measuring the data with the rear wheels. Thus, the system can decode the information using the IMU associated with the front wheels and subsequently decodes the information from the same encoded strip (or a copy of the strip intended for other wheels) with the rear wheels, and a comparison of the decoded information provides verification of the data.

The encoded strip can have a limit to the maximum and minimum width of the grooves, as well as the amplitude. A readout software executed by the processing device of the vehicle and/or mission control can filter the accelerometer and/or gyroscope data along with the vehicle velocity data to determine the vertical motion of each wheel surface in time/space, thereby reading out the "barcode" or binary code encoded in the strip. The information can be low-density, e.g., a single integer that points to a database of geo-located points along a road, or a multiple of some fixed distance along the road from a known origin. In either case, with adequate mapping, the vehicle can determine its position along the road or globally by driving over the encoded strip.

The encoded strip provides advantages over existing localization technology. Use of the encoded strip is simpler, necessitating only a sensor (e.g., accelerometer) for readout. Additional sensors on the vehicle are not needed, such as cameras, RADAR, LiDAR, complex processing hardware, software pipelines, or the like, although these components could be used as well. Decoding of the strip can be performed even when the road is partially occluded by rain, snow, dust, precipitative, or other substances. The system therefore offers means for encoding and decoding information as vehicles travel along a roadway, without necessitating additional signage around the roadway and generally implementing sensors already included on vehicles.

Various embodiments in the present disclosure are described with reference to FIGS. 1-11 below.

Figure 2:
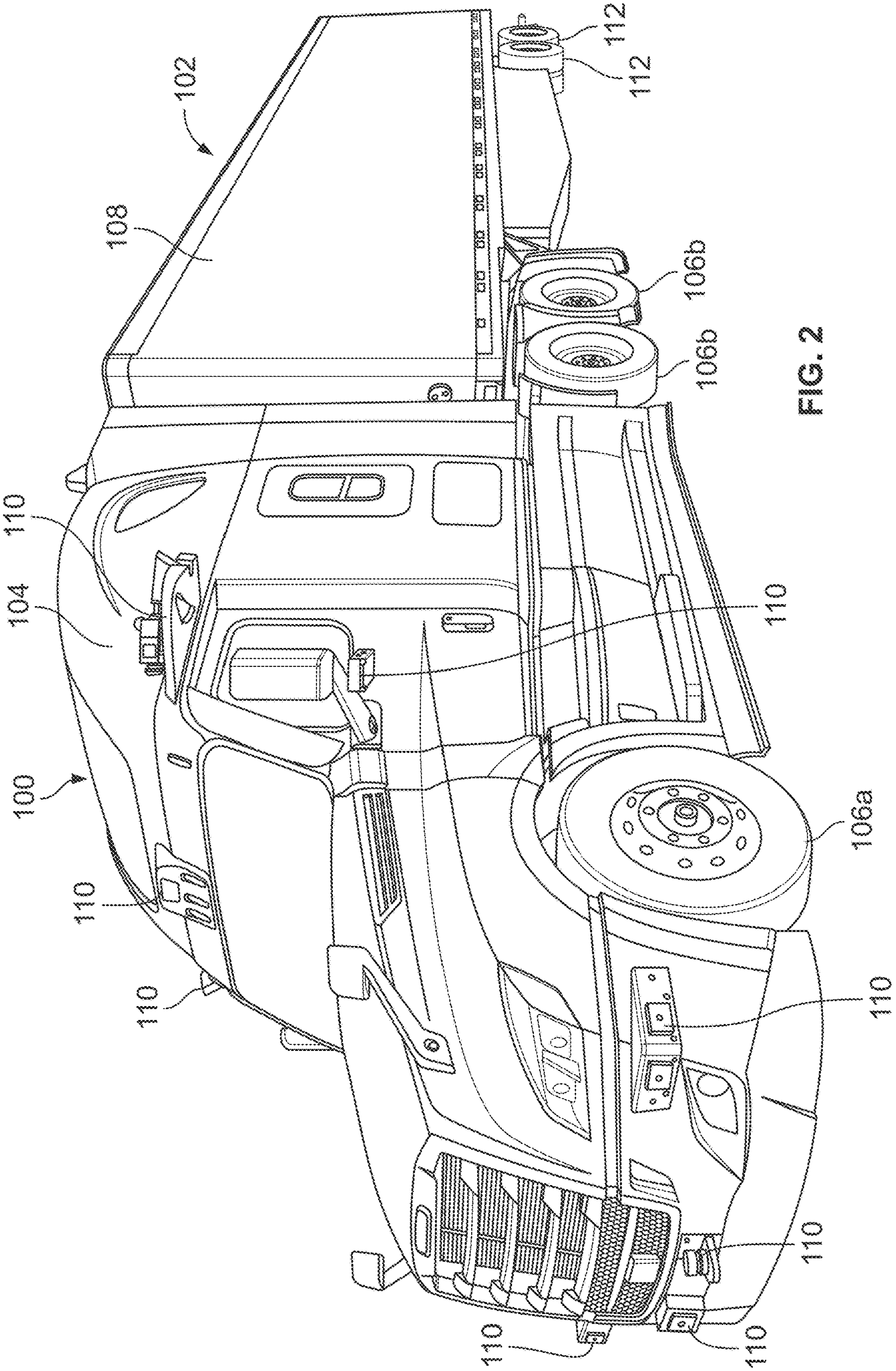
FIG. 2 is a schematic perspective view of an autonomous truck and trailer.
Figure 3:
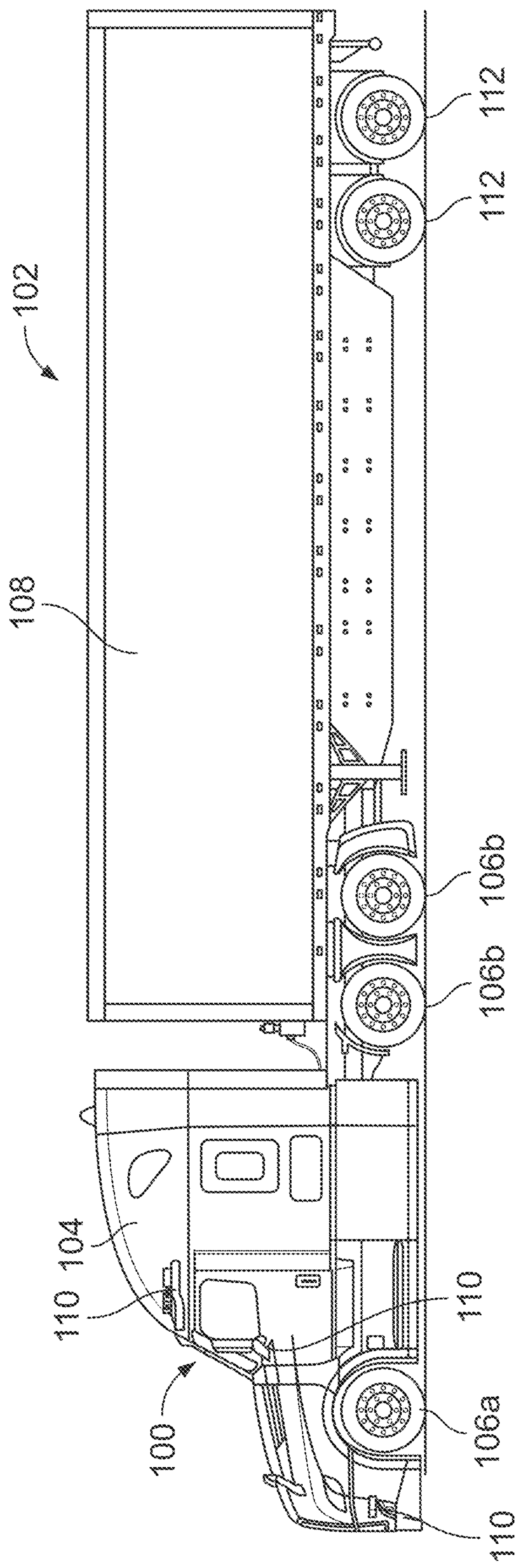
FIG. 3 is a schematic side view of an autonomous truck and trailer.

FIG. 1 is a perspective view of a vehicle 100, such as a truck that may be conventionally connected to a single or tandem trailer 102 to transport the trailer 102 to a desired location, as shown in FIGS. 2 and 3, which are, respectively, perspective and side views of the vehicle 100 of FIG. 1 with the trailer 102 attached thereto. The vehicle 100 includes a cabin 104 that can be supported, and steered in the required direction, by front wheels **106*a* and rear wheels 106*b* that are partially shown in FIG. 1. The front wheels 106*a* are positioned by a steering system that includes a steering wheel and a steering column (not shown). The steering wheel and the steering column may be located in the interior of cabin 104**.

The vehicle 100 may be an autonomous vehicle, in which case the vehicle 100 may omit the steering wheel and the steering column to steer the vehicle 100. Rather, the vehicle 100 may be operated by an autonomy computing system of the vehicle 100 based on data collected by a sensor network including one or more sensors, e.g., sensors 110 shown in FIGS. 1-3. The vehicle 100 may additionally include a fifth-wheel coupling (not shown) to which the trailer 102 can be releasably attached. The trailer 102 can include a storage container 108 and a plurality of rear wheels 112 that support the storage container 108. It should be understood that in some embodiments the vehicle 100 and the trailer 102 can be a permanently attached as a single unit.

The sensors 110 have a field-of-view at the front, sides and/or rear of the vehicle 100. Similar sensors 110 can be used around the perimeter of the vehicle 100 to ensure full environmental coverage around the vehicle 100 is provided by the sensors 110. In some embodiments, the vehicle 100 can include, e.g., 5-6 LIDAR sensors, 8-10 cameras, combinations thereof, or the like. In some embodiments, the vehicle 100 can tow a trailer 102 and the trailer 102 can similarly include LIDAR sensors and/or cameras to provide field-of-view coverage around the perimeter of the vehicle 100 and the trailer 102. The environmental coverage by the sensors and/or cameras therefore provides data corresponding with the front, rear, sides and corners of the vehicle 100 and the trailer 102 hauled by the vehicle 100.

Figure 4:
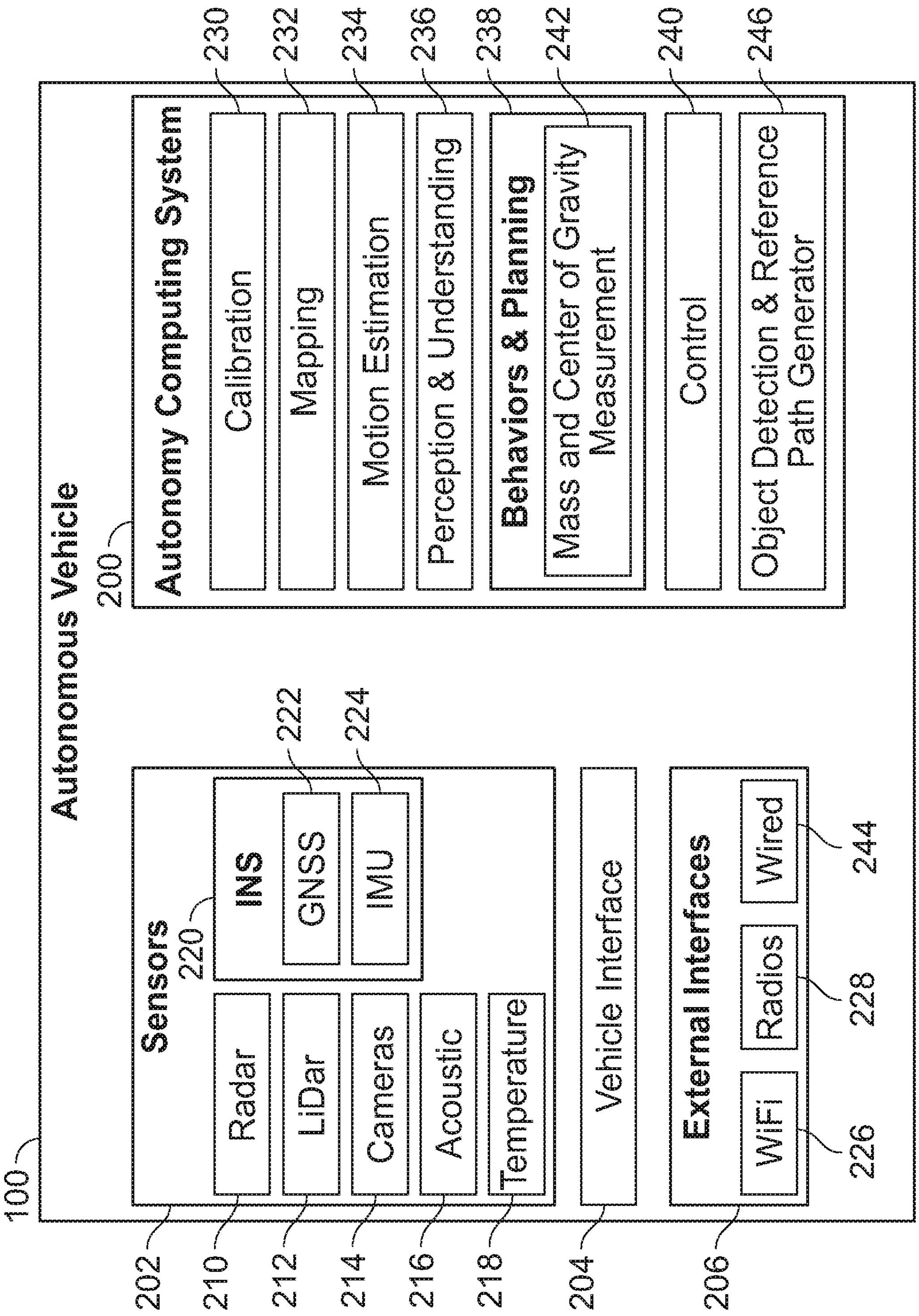
FIG. 4 is a block diagram of the autonomous truck shown in FIGS. 1-3.

FIG. 4 is a block diagram representing autonomous vehicle 100 shown in FIGS. 1-3. In the example embodiment, autonomous vehicle 100 generally includes autonomy computing system 200, sensors 202, a vehicle interface 204, and external interfaces 206. It should be understood that the sensors 110 on the vehicle 100 in FIGS. 1-3 and described herein correspond to the sensors identified as 202 in FIG. 4. The sensors 110 may specifically comprise any of the sensors 210-220 shown in FIG. 4 and described herein.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operations of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be processed to identify one or more construction markers in the environment surrounding autonomous vehicle 100. In some embodiments, the image data generated by cameras 214 may be sent to autonomy computing system 200 or other aspects of autonomous vehicle 100 for one or more of identifying objects around the vehicle 100, updating a reference path based on the detected objects, and controlling operation of the vehicle 100 to guide the vehicle 100 along its route.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. RADAR sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw RADAR sensor data) from the emitted radio waves. In some embodiments, the system inputs from cameras 214, RADAR sensors 210, or LiDAR sensors 212 may be used in combination to identify one or more construction markers (or nodes) around autonomous vehicle 100.

GNSS receiver 222 is positioned on autonomous vehicle 100 and may be configured to determine a location of autonomous vehicle 100, which it may embody as GNSS data. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100. In some embodiments, the trailer associated with the vehicle 100 can include similar sensors 202 for gathering similar data associated with the trailer, thereby further assisting with control operations of the autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5g, Bluetooth, etc.).

In some embodiments, external interfaces 206 may be configured to communicate with an external network via a wired connection 226, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically, or manually) via external interfaces 206 or updated on demand. In some embodiments, autonomous vehicle 100 may deploy with all of the data it needs to complete a mission (e.g., perception, localization, and mission planning) and may not utilize a wireless connection or other connections while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a mass and center of gravity measurement module 242, a control module or controller 240, and an object detection and reference path generator module 246. The object detection and reference path generator module 246, for example, may be embodied within another module, such as behaviors and planning module 238, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

Autonomy computing system 200 of autonomous vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Figure 5:
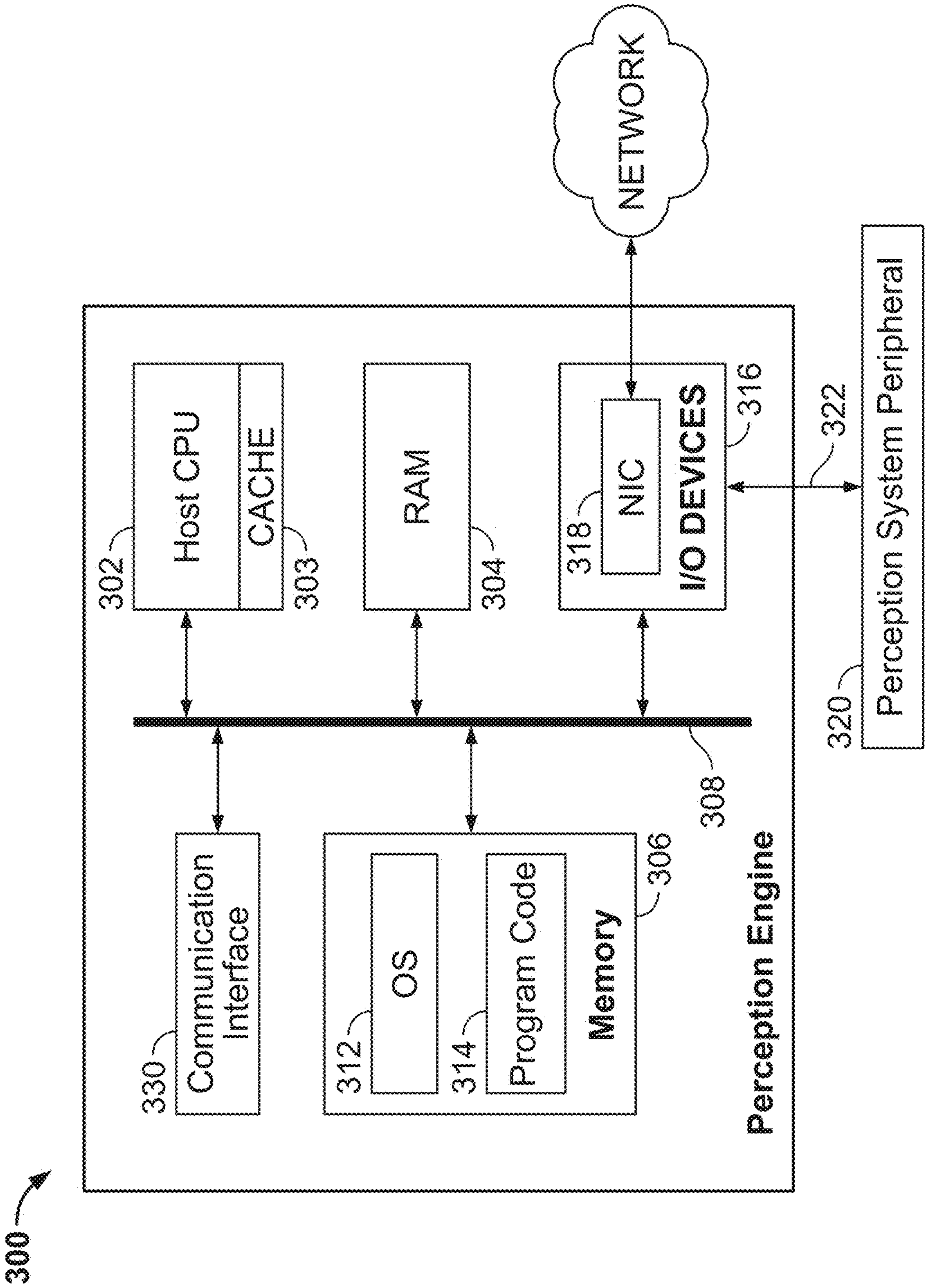
FIG. 5 is a block diagram of an example computing system.

FIG. 5 is a block diagram of an example computing system 300, such as the autonomy computing system 200 shown in FIG. 4, configured for sensing an environment in which an autonomous vehicle is positioned. Computing system 300 includes a CPU 302 coupled to a cache memory 303, and further coupled to RAM 304 and memory 306 via a memory bus 308. Cache memory 303 and RAM 304 are configured to operate in combination with CPU 302. Memory 306 is a computer-readable memory (e.g., volatile, or non-volatile) that includes at least a memory section storing an OS 312 and a section storing program code 314. Program code 314 may be one of the modules in the autonomy computing system 200 shown in FIG. 4. In alternative embodiments, one or more sections of memory 306 may be omitted and the data stored remotely. For example, in certain embodiments, program code 314 may be stored remotely on a server or mass-storage device and made available over a network 332 to CPU 302.

Computing system 300 also includes I/O devices 316, which may include, for example, a communication interface such as a network interface controller (NIC) 318, or a peripheral interface for communicating with a perception system peripheral device 320 over a peripheral link 322. I/O devices 316 may include, for example, a GPU for image signal processing, a serial channel controller or other suitable interface for controlling a sensor peripheral such as one or more acoustic sensors, one or more LiDAR sensors, one or more cameras, or a CAN bus controller for communicating over a CAN bus.

Figure 6:
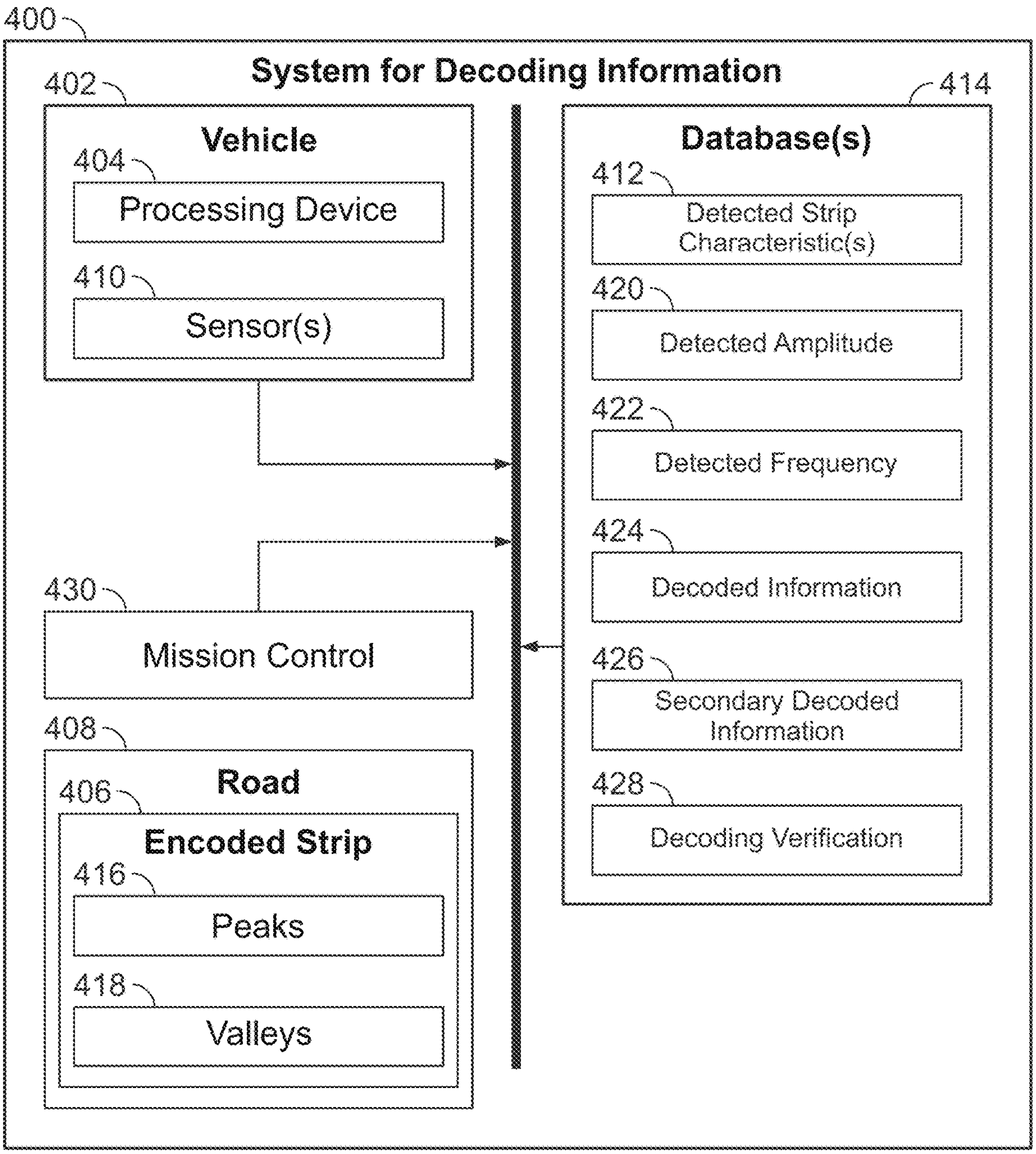
FIG. 6 is a block diagram of an exemplary system for decoding information.

FIG. 6 is a block diagram of an exemplary system 400 for decoding information. The system 400 generally includes one or more vehicles 402 (e.g., autonomous vehicle 100). Each vehicle 402 includes a processing device 404 (e.g., computing system 200, computing system 300, or the like) configured to receive and process data for decoding information from an encoded strip 406 disposed on, attached to, or formed in a roadway 408. At least some of the data received by the processing device 404 can be data from one or more sensors 410 (e.g., sensors 202). For example, the sensors 410 can be in the form of one or more, e.g., accelerometers, gyroscopes, or the like, configured to detect a characteristic 412 associated with the encoded strip 406. The vehicle 402 can include one or more databases 414 (e.g., memory 306) configured to receive and electronically store data. In some embodiments, the database 414 can be stored externally from the vehicle 402 (e.g., at mission control 430, or the like) and the vehicle 402 can be in communication with the external database 414 for receiving and/or transmitting data associated with the system 400.

In some embodiments, the encoded strip 408 can be disposed on, e.g., the shoulder of the roadway, partially on the shoulder and partially on the vehicle lane, solely the vehicle lane, combinations thereof, or the like. In some embodiments, a single encoded strip 408 can be used per roadway or lane. In some embodiments, multiple encoded strips 408 can be used on each roadway or lane. For example, one encoded strip 408 can be used for the left wheel(s) of the vehicle 402, and another encoded strip 408 can be used for the right wheel(s) of the vehicle 402 within the same lane or roadway.

Each encoded strip 406 includes a series of specifically spaced peaks 416 and valleys 418. For example, if the encoded strip 406 is a separate element configured to be adhered or secured to the road 408 surface, the base for the strip 406 can define the bottommost portion of the valleys 418 and raised elements on top of the base for the strip 406 can define the peaks 416. In some embodiments, the encoded strip 406 can at least partially be fabricated from, e.g., recycled rubber, asphalt, thermoplastic pavement, plastic, ceramic, epoxy, polyethylene terephthalate (PET), combinations thereof, or the like. Recycled rubber is generally durable and economical strips, and fabrication from the recycled rubber would allow the encoded strip 406 to withstand all weather conditions. A milled encoded strip 406 could be created by cutting grooves into asphalt with a rotary cutting head. A raised encoded strip 406 could be made from thermoplastic pavement, which can include side-by-side raised pavement markers, rumble bars, and/or plastic inserts. Botts' dots or raised elements could be made from plastic materials, such as polyester or recycled polypropylene. Botts' dots or raised elements could be made from a ceramic material. Botts' dots could be made from PET, which is made from purified terephthalic acid (PTA) and ethylene glycol. Epoxy or a similar adhesive could be used to glue the encoded strip 406 to the road. As a further example, if the encoded strip 406 is formed in the road 408 surface, grooves can be formed in the surface (similar to a rumble strip) with the bottommost portion of the grooves defining the valleys 418 and the surface of the road 408 defining the peaks 416.

It should be understood that in contrast to a traditional rumble strip in which the grooves or raised areas are formed at equal distances along the entire length of the rumble strip, the encoded strip 406 includes a specific selection and formation of amplitudes and/or frequencies. In particular, the amplitude can be based on the depth of the valley 418 relative to the peaks 416, and the frequency can be the spacing formed by the valleys 418 between the respective peaks 416. Thus, the depth of the grooves/valleys and the distance between the peaks 416 and/or valleys 418 can be varied to have different amplitudes and/or frequencies, thereby encoding information based on the pattern of the grooves. Further, it is understood that the selected amplitude and/or frequency create a decodable pattern in the strip 406.

As the vehicle 402 travels along the road 408, one or more wheels of the vehicle 402 pass over the encoded strip 406. The sensor(s) 410 can be directed to detecting specific movement of one or more wheels of the vehicle 402 based on the amplitude/frequency pattern of the encoded strip 406. The sensors 410 therefore detect and identify the specific movement of the one or more wheels as a detected strip characteristic 412. In some embodiments, the characteristic 412 can be a vibration pattern created by the peaks 416 and valleys 418 of the encoded strip 406 as the tire of the vehicle 402 passes over the encoded strip 406. In some embodiments, the characteristic 412 can be an up and down motion pattern of the tire relative to the surface of the road 408 created by the peaks 416 and valleys 418 of the encoded strip 406 as the tire of the vehicle 402 passes over the encoded strip 406. In some embodiments, the characteristic 412 can be an angular rotation pattern of the tire relative to the surface of the road 408 created by the peaks 416 and valleys 418 of the encoded strip 406 as the tire of the vehicle 402 passes over the encoded strip 406. In some embodiments, a combination of the characteristics 412 can be simultaneously detected and identified.

From the detected characteristics 412, the processing device 404 can extract a detected amplitude 420 and/or a detected frequency 422. Using this extracted information, the processing device 404 can determine the amplitude 420 and/or frequency 422 pattern, and the equivalence of this pattern in terms of usable data, e.g., binary code information, text data, or the like. The processing device 404 can therefore use the amplitude 420 and/or frequency 422 pattern to generate decoded information 424, which provides useful or usable data to the vehicle 402 and/or mission control 430. This information can include, e.g., localization data, environmental data, or the like. The system 400 therefore allows specific data to be encoded into the strip 406 for detection and processing using wheels/tires of the vehicle 402 as it passes over the strip 406.

In some embodiments, a single decoding operation can be performed using a single wheel or single set of wheels (e.g., left or right wheels) of the vehicle 402. In some embodiments, the system 400 can include a verification step to ensure the initially decoded information is accurate. In some embodiments, one or more left side wheels and one or more right side wheels of the vehicle 402 can each include sensors 410, and the road 408 can include two or more encoded strips such that both sets of wheels are usable to decode information from the strip 406. In some embodiments, sensors 410 can be used to decode information for one wheel on the left (or right) side of the vehicle 402, e.g., a front wheel, and additional sensors 410 can be used to decode information for another wheel on the left (or right) side of the vehicle 402, e.g., a rear wheel.

Thus, one wheel can be used to generate the decoded information 424, and the secondary wheel can be used to generate secondary decoded information 426 in a similar manner. In some embodiments, both wheels can generate the decoded information 424, 426 using the same type of characteristic 412. In some embodiments, the wheels can generate the decoded information 424, 426 using different types of characteristics 412. In each case, the decoded information 424, 426 can be compared by the processing device 404 to create a verification 428 regarding accuracy/matching of the decoded information 424, 426. If a match does not exist or if the match is below a predetermined percentage value, an alert can be issued to the vehicle 402 and/or mission control 430 regarding failure to accurately decode the information from the strip 406. In some embodiments, because the encoded information includes discrete values, anything less than a complete match could be considered erroneous and an alert can be issued to the vehicle 402 and/or mission control 430.

Figure 7:
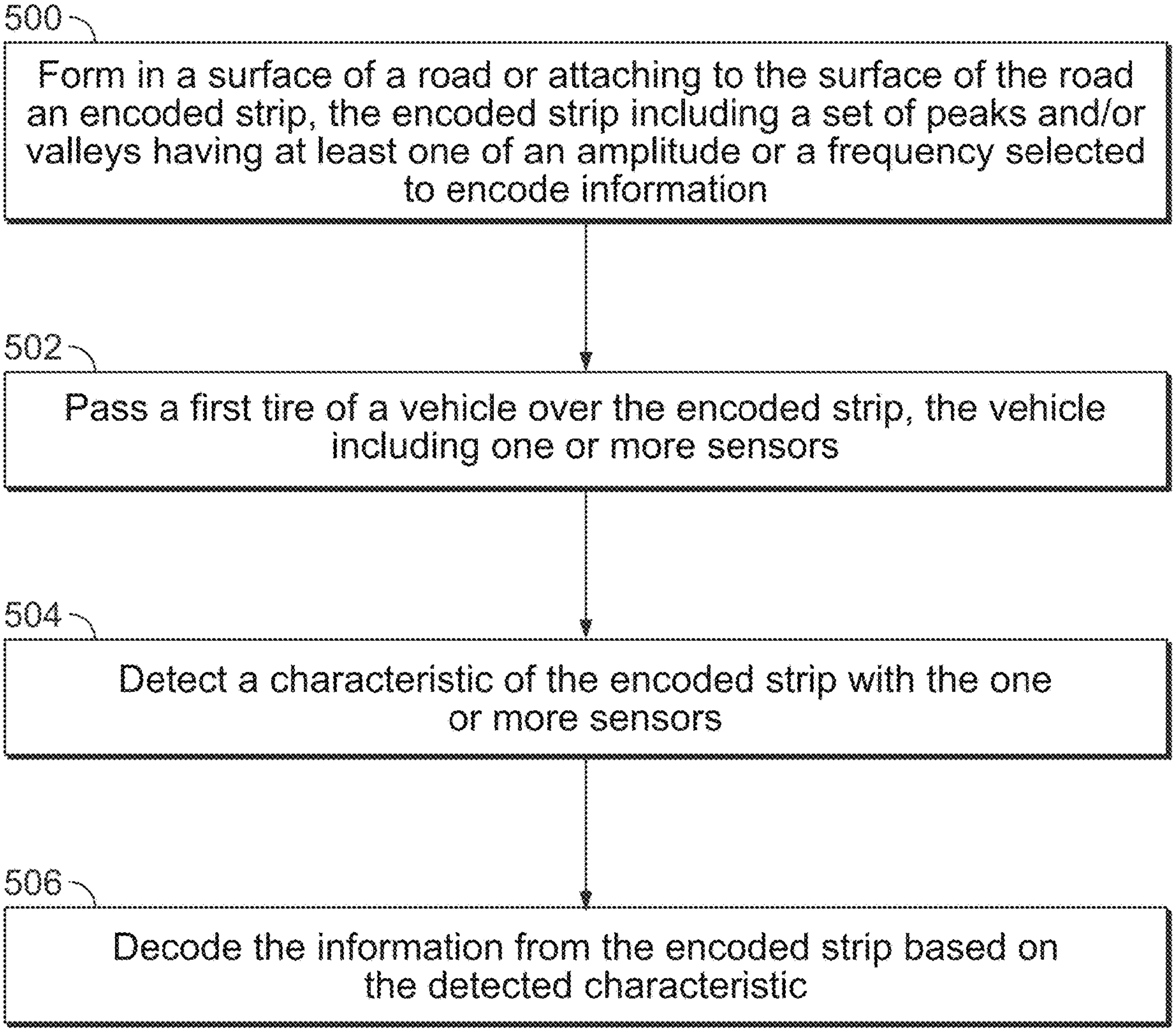
FIG. 7 is a flowchart of a method for decoding information.

FIG. 7 is a flowchart of a method of decoding information by the exemplary system 400 discussed herein. At 500, an encoded strip can be formed in a surface of a road or attached to the surface of the road. The encoded strip includes a set of peaks and/or valleys having at least one of an amplitude or a frequency selected to encode information. At 502, a fist tire of a vehicle is passed over the encoded strip. The vehicle includes sensors that, at 504, detect one or more characteristics of the encoded strip. At 506, information is decoded from the encoded strip based on the detected characteristic using a processing device.

Figure 8:
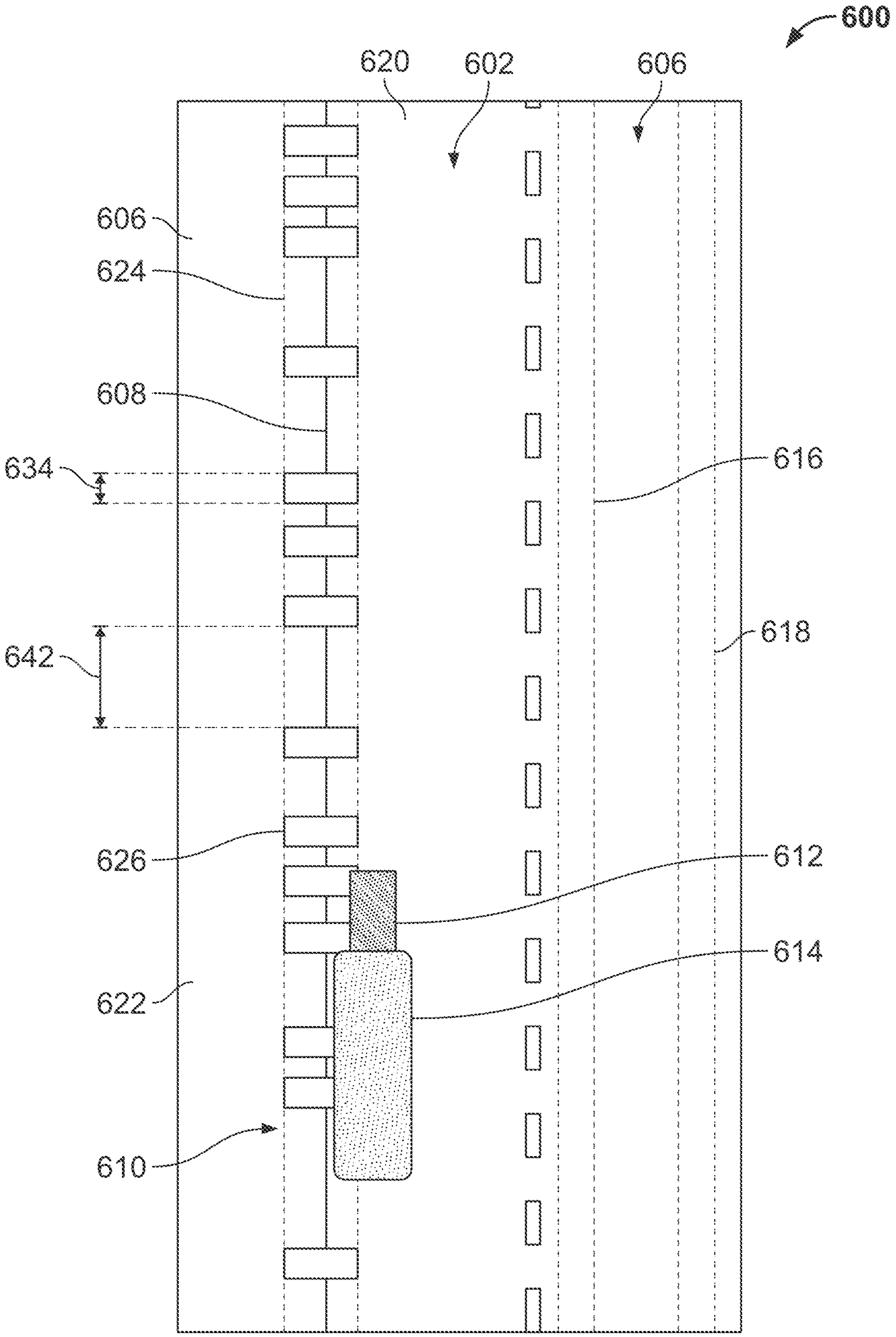
FIG. 8 is a top view of a road surface including an encoded strip of the exemplary system for decoding information.

FIG. 8 is a top view of a road 600 including two lanes 602, 604. A shoulder 606 can extend along the lane 602 along a joint 608. In general, the joint 608 can include lane markers, e.g., a solid line, to designate the leftmost portion of the lane 602. In some embodiments, an encoded strip 610 (e.g., encoded strip 406 with peaks 416 and valleys 418) can be positioned on or formed on the road 600 along the joint 608. In some embodiments, the encoded strip 610 can overlap both the shoulder 606 and the lane 602. In some embodiments, the encoded strip 610 can be positioned solely along the shoulder 606 or solely along the lane 602. In some embodiments, the vehicle 612 (e.g., hauling a trailer 614) can use the lane marker along the joint 608 to locate the encoded strip 610. As illustrated in FIG. 8, the left wheels of the vehicle 612 (and/or trailer 614) can be used to decode information from the strip 610. In some embodiments, rather than a single encoded strip 610, two or more encoded strips 616, 618 within the lane 606 can be used for respective left and right wheels of the vehicle 612 (and/or trailer 614) such that both sets of wheels are used for decoding information.

Figure 9:
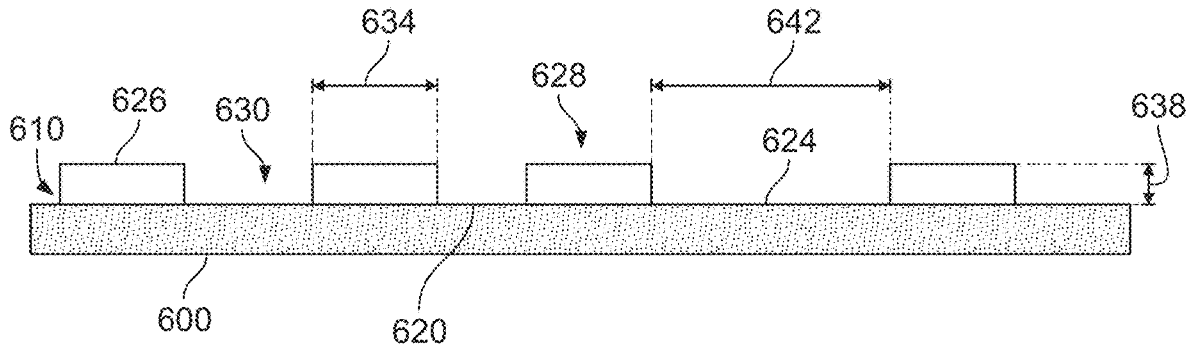
FIG. 9 is a side view of a road surface including an encoded strip disposed over the road surface.
Figure 10:
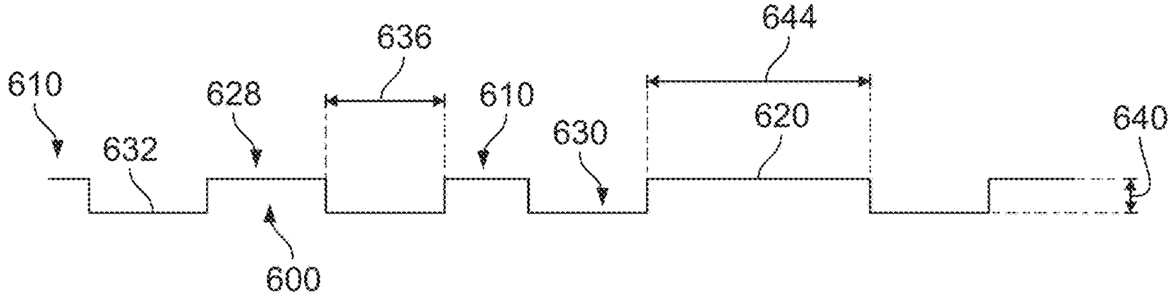
FIG. 10 is a side view of a road surface including an encoded strip formed in the road surface.

In combination with FIG. 8, FIGS. 9 and 10 illustrate side views of different versions of how the encoded strip 610 can be used with the road 600. In FIG. 9, the encoded strip 610 is attached as a separate element to a top surface 620 of the road 600 (and/or a top surface 622 of the shoulder 606). The encoded strip 610 can include a base 624 upon which raised elements 626 (e.g., markers) are formed or secured. The base 624 can be adhered or otherwise secured to the top surface 620 of the road 600, thereby installing the encoded strip 610 without modification of the original road 600. The top of each respective raised element 626 defines a peak 628, and the gaps between the raised elements 626 define the valleys 630.

In FIG. 10, the encoded strip 610 is formed in the road 600 itself. In particular, spaced grooves 632 can be formed in the top surface 620 of the road 600, with the bottom of the grooves defining the valleys 630 and the top surface 620 of the road 600 defining the peaks 628. In each instance, the peaks and valleys include a specifically selected amplitude and/or frequency. For example, each raised element 626 in FIG. 9 can define a width 634, which is equivalent to a width 636 of the valleys 630 in FIG. 10. In some embodiments, the width 634, 636 can be about, e.g., 3-5 inches inclusive, 3-4 inches inclusive, 4-5 inches inclusive, 3 inches, 4 inches, 5 inches, or the like, as measured along the direction of travel of the vehicle 612. In some embodiments, the width 634, 636 may or may not be used encode information, depending on the level of fidelity of the sensors used for decoding.

Further, a height 638 of each raised element 626 in FIG. 9 (similar to a depth 640 of the valleys 630 in FIG. 10) can represent an amplitude value. In some embodiments, the height 638 or depth 640 can be about, e.g., 1 inch or less. Further, a width or distance 642 between raised elements 626 in FIG. 9 (similar to a width or distance 644 between valleys 630 in FIG. 10) can represent a frequency value. In some embodiments, the distance 642, 644 can be, e.g., between about 2-24 inches inclusive, 2-20 inches inclusive, 2-16 inches inclusive, 2-12 inches inclusive, 2-8 inches inclusive, 2-4 inches inclusive, 4-24 inches inclusive, 8-24 inches inclusive, 12-24 inches inclusive, 16-24 inches inclusive, 20-24 inches inclusive, 8-20 inches inclusive, 12-20 inches inclusive, 10 inches or greater, or the like. In some embodiments, the distance 642, 644 can be used as a reference point, e.g., if a binary based approach is used. In such embodiments, the width 634 can be used for encoding the data rather than the distance 644. The peaks and valleys can therefore be formed selectively in the encoded strip 610 to change the amplitude and/or frequency to encode information/data.

Figure 11:
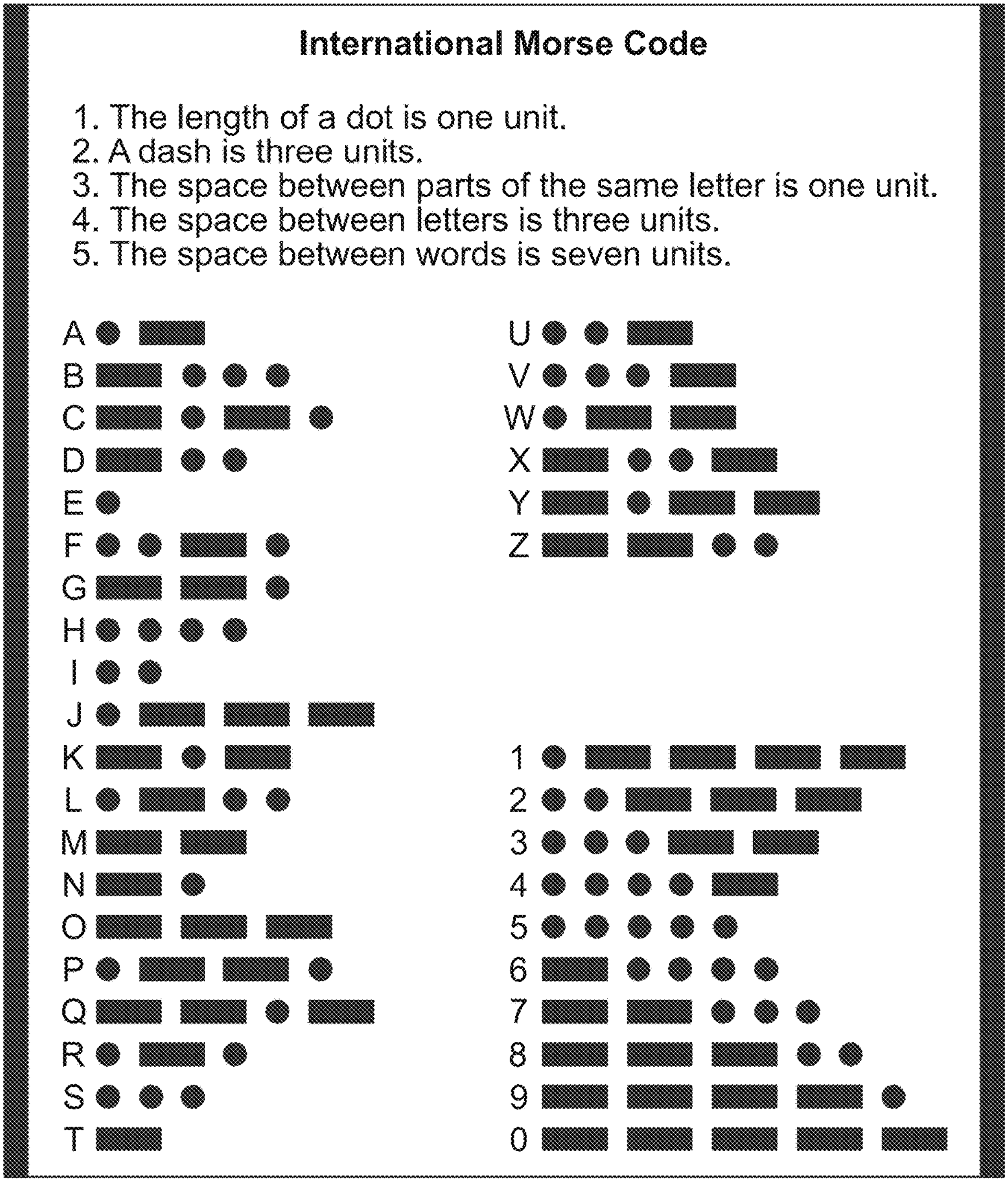
FIG. 11 is a table of international Morse Code standards.

For example, FIG. 11 illustrates Morse Code standards and the encoded strip 610 can be used similarly to create patterns recognizable as representative of alphanumerical values. For example, three valleys or peaks close together and a large gap separating the next one or more valleys or peaks can be equated with the dot and dash pattern used in Morse Code. As a further example, a dot in Morse Code can be equivalent to a single marker (e.g., peak or valley) and a dash in Morse Code can be equivalent to three markers (e.g., peaks or valleys) in succession. Thus, various patterns can be formed in the encoded strip for detection by sensors of the vehicle as the vehicle passes over the roadway.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A system for decoding data, comprising:

a road defining a surface;

an encoded strip formed in the surface of the road or attached to the surface of the road, wherein the encoded strip includes a set of peaks and/or valleys having at least one of an amplitude or a frequency selected to encode data into the set of peaks and/or valleys;

one or more sensors associated with a vehicle;

a processing device in communication with the one or more sensors, wherein the processing device is configured to execute instructions stored in a memory to perform operations comprising:

as a first tire of the vehicle passes over the encoded strip, detecting a characteristic of the encoded strip with the one or more sensors; and decoding the data from the encoded strip based on the detected characteristic.

2. The system of claim 1, wherein the vehicle is an autonomous vehicle.

3. The system of claim 1, wherein the amplitude is a valley depth relative to the peaks, and the frequency is a valley spacing between the peaks.

4. The system of claim 1, wherein the one or more sensors include at least one of an accelerometer or a gyroscope.

5. The system of claim 1, wherein the detected characteristic is a vibration pattern created by the peaks and/or valleys of the encoded strip as the first tire of the vehicle passes over the encoded strip.

6. The system of claim 1, wherein the detected characteristic is an up and down motion pattern of the first tire relative to the surface of the road created by the peaks and/or valleys of the encoded strip as the first tire of the vehicle passes over the encoded strip.

7. The system of claim 1, wherein the detected characteristic is an angular rotation pattern of the first tire relative to the surface of the road created by the peaks and/or valleys of the encoded strip as the first tire of the vehicle passes over the encoded strip.

8. The system of claim 1, wherein the operations comprise, as a second tire of the vehicle passes over the encoded strip, detecting the characteristic of the encoded strip with at least one sensor associated with the second tire of the vehicle.

9. The system of claim 8, wherein the operations comprise decoding the data from the encoded strip based on the detected characteristic.

10. The system of claim 9, wherein the operations comprise comparing the data decoded from the first tire and the second tire as confirmation of accurate decoding.

11. The system of claim 1, wherein the data includes geolocation information associated with the road.

12. The system of claim 1, wherein the encoded strip is a rumble strip.

13. The system of claim 1, wherein the amplitude and/or the frequency of the set of peaks and/or valleys results in a binary pattern detectable by the one or more sensors of the vehicle.

14. A computer-implemented method for decoding data, comprising:

forming in a surface of a road or attaching to the surface of the road an encoded strip, wherein the encoded strip includes a set of peaks and/or valleys having at least one of an amplitude or a frequency selected to encode data into the set of peaks and/or valleys;

passing a first tire of a vehicle over the encoded strip, the vehicle including one or more sensors; and executing instructions stored in a memory with a processing device in communication with the one or more sensors to perform operations comprising:

detecting a characteristic of the encoded strip with the one or more sensors; and decoding the data from the encoded strip based on the detected characteristic.

15. The computer-implemented method of claim 14, wherein the amplitude is a valley depth relative to the peaks, and the frequency is a valley spacing between the peaks.

16. The computer-implemented method of claim 14, wherein the detected characteristic is a vibration pattern created by the peaks and/or valleys of the encoded strip as the first tire of the vehicle passes over the encoded strip.

17. The computer-implemented method of claim 14, wherein the detected characteristic is an up and down motion pattern of the first tire relative to the surface of the road created by the peaks and/or valleys of the encoded strip as the first tire of the vehicle passes over the encoded strip.

18. A data-encoded road, comprising:

a road defining a surface; and an encoded strip formed in the surface of the road or attached to the surface of the road;

wherein the encoded strip includes a set of peaks and/or valleys having at least one of an amplitude or a frequency selected to encode data into the set of peaks and/or valleys configured to be decoded by a sensor of a vehicle passing over the encoded strip.

19. The data-encoded road of claim 18, wherein the amplitude is a valley depth relative to the peaks, and the frequency is a valley spacing between the peaks.

20. The data-encoded road of claim 18, wherein the data is configured to be decoded by the sensor of the vehicle when a tire of the vehicle passes over the encoded strip.

* * * * *